Dec. 16, 1930. J. J. SCHMERLER 1,785,599
COMBINED OPENER AND CLOSURE FOR PAPER MILK CONTAINERS
Filed Feb. 28, 1929
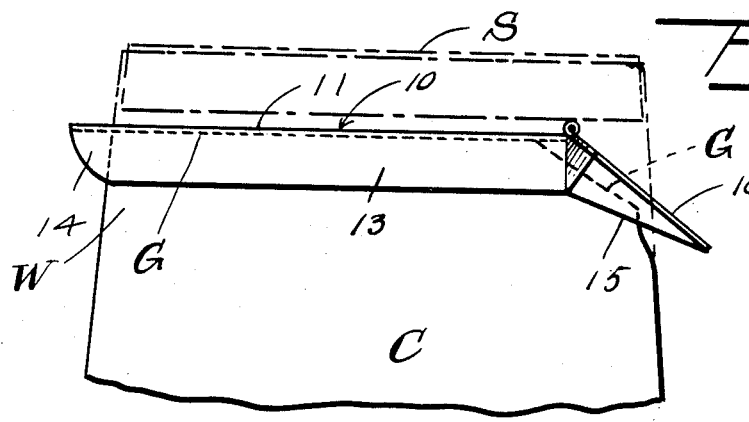
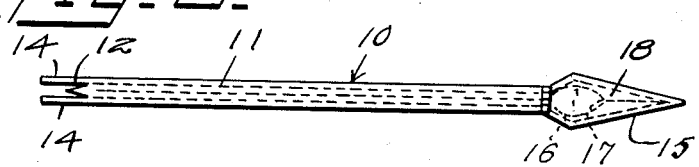
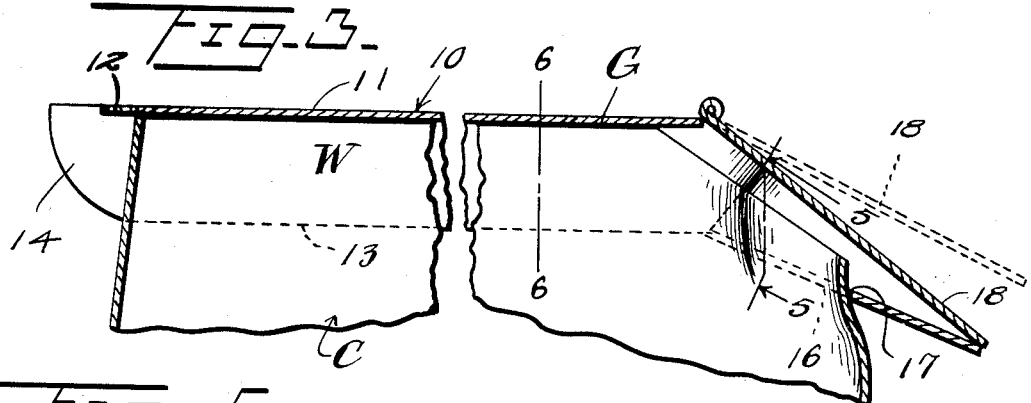
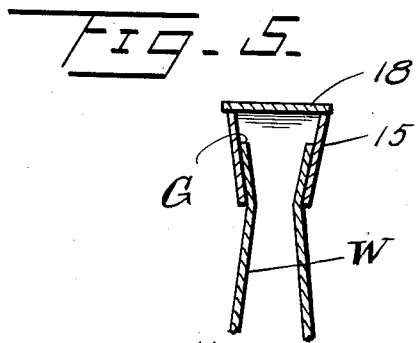
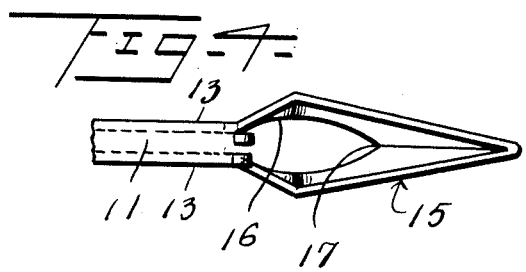
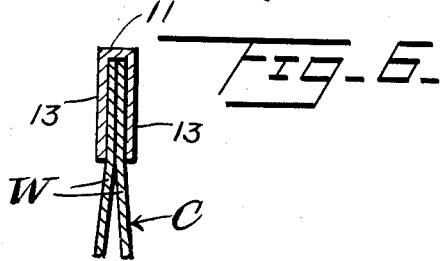
Inventor
J. J. Schmerler
By Watson E. Coleman
Attorney Patented Dec. 16, 1930

1,785,599

UNITED STATES PATENT OFFICE

JOSEPH J. SCHMERLER, OF NEW YORK, N. Y.

COMBINED OPENER AND CLOSURE FOR PAPER MILK CONTAINERS

Application filed February 28, 1929. Serial No. 343,375.

This invention relates to a combined opener and closure for paper milk containers, and more particularly to that type of container where the side walls converge upwardly and are brought into abutting engagement at their upper ends by a metallic clamping strip.

Containers of this character are opened by removing the portions of the container clamped by the seal with a pair of scissors or a knife, a corner of the container being usually cut away to form a convenient pouring opening. Containers of this character are inconvenient where the householder does not employ the entire contents of the container as soon as it is opened, due to the fact that there is no means for sealing the upper end of the container and accordingly the milk is very liable to become tainted. Accordingly, an important object of the present invention is to provide a device which may be employed for cutting the seal from the container and which, upon completion of its cutting operation, is positioned to seal the container to protect the contents thereof.

A still further object of the invention is to provide a device of this character which includes a convenient pouring spout and a cover therefor, so that the only portion of the container which need be opened at any time to secure a portion of its contents will be shielded against the entrance of foreign matter.

These and other objects I attain by the construction shown in the accompanying drawings, wherein for the purpose of illustration is shown a preferred embodiment of my invention and wherein:—

Figure 1 is a side elevation showing a combined opener and closure for paper milk containers applied to the milk container, the dotted lines indicating the portions of the milk container which are removed by the apparatus;

Figure 2 is a plan view of the apparatus;

Figure 3 is a vertical sectional view through the apparatus in position upon the container;

Figure 4 is an enlarged plan view of the spout end of the apparatus with the cover removed;

Figure 5 is a section on the line 5—5 of Figure 3;

Figure 6 is a section on the line 6—6 of Figure 3.

Referring now more particularly to the drawing, the numeral 10 generally designates a channel member, the base 11 of which at one end is formed as a pointed piercing and cutting blade 12. The flanges 13 of this channel preferably converge toward one another at their free edges and project slightly beyond the end of the cutting blade, as indicated at 14, to form a guide.

Secured to the opposite ends of the flanges and inclining downwardly therefrom is a substantially spoon-shaped pouring spout 15, the bottom of which has an opening 16 formed therein adjacent the inner or attached end of the spout. The outer end of this opening is preferably pointed, as indicated at 17, for a purpose presently to appear.

Since the walls of this spout will rigidify the flanges 11 at the points of their attachment, these flanges 11 are at this end of the channel member spaced apart a distance equal to the thickness of the opposed walls W of a paper container C with which the device is intended to be employed. To the base 11 of the channel member at this end of the device, a lid 18 for the spout is pivoted.

Containers of the type mentioned are sealed upon delivery by a metallic strip S which clamps the upper ends of the walls W thereof to one another. Such containers are usually provided with a dotted line G acting as a guide for cutting away the seal, this line inclining downwardly at one end to form a convenient pouring spout.

In practice, that edge of the container at which the lower end of the inclined portions of the guide line G terminates, is introduced between the extended portions 14 of the flanges 13 until the blade 12 is engaged with said edge at said end of the guide line. The device is then manipulated to cause the blade 12 to follow the guide line G, and the manipulation of the device is continued until the blade reaches a point outwardly beyond the opposite edge of the container, with the result that the upper portion of the container and its seal S are removed. The base 11 of the device now extends entirely across the upper horizontal edges of the walls of the container; the flanges 13 of the device extend below said edges of the container and contact with the outer surfaces of the walls of the container, and the spout 15 of the device receives that portion of the container immediately adjacent the inclined upper edges of the container. During the severing of the upper portion of the container, the extended portions 14 of the flanges 13 prevented the walls of the container from moving laterally away from the blade 12. These portions also constitute a guard which prevents the accidental engagement of the fingers with the blade while the device is on the container and while it is not in use.

By the wedging engagement of the tapered point of the spout against the ends of the walls, these walls are brought together and at the same time cramped toward the far edge of the container, causing them to buckle outwardly into the opening 16, so that a discharge opening for the container is formed. The clamping engagement of the flanges seals the remainder of the container and it will be obvious that when the lid 18 is closed, nothing can enter the discharge opening of the container to taint the contents thereof. The device can be left in place upon the container until it is either empty or the contents thereof no longer desired when it may be readily removed for use with a second container.

As the structure is extremely simple, the device may be readily cleaned and manipulated and the cost of manufacture thereof will be extremely small. Since this construction is capable of a certain range of change and modification without materially departing from the spirit of the invention, I do not limit myself thereto except as hereinafter claimed.

I claim:—

1. In a device for the purpose described, a pair of guides adapted to receive therebetween the walls of a container a portion of which is to be severed, a knife associated with said walls for severing said portion, and means associated with said guide and knife for clampingly receiving the upper edge of the container when the severing operation is completed.

2. In a device for the purpose described, a pair of guides adapted to receive therebetween the walls of a container a portion of which is to be severed, a knife associated with said walls for severing said portion, and means associated with said guide and knife for clampingly receiving the upper edge of the container when the severing operation is completed, said means including opposed elements between which the upper edge of the container is disposed by the severing operation.

3. In a device for the purpose described, a pair of guides adapted to receive therebetween the walls of a container a portion of which is to be severed, a knife associated with said walls for severing said portion, and means associated with said guide and knife for clampingly receiving the upper edge of the container when the severing operation is completed, said guides constituting continuations of said clamping means.

4. An implement for the purpose described comprising a channel member one end of the base of which is in the form of a knife for severing a container to remove the seal thereof, the flanges of the channel member constituting resilient clamping members engaging the walls of the container after severing of the seal therefrom to bring the same into sealing contact with one another.

5. An implement for the purpose described comprising a channel member one end of the base of which is in the form of a knife for severing a container to remove the seal thereof, the flanges of the channel member constituting resilient clamping members engaging the walls of the container after severing of the seal therefrom to bring the same into sealing contact with one another, said flanges being extended beyond the base of the channel to produce guides directing the material of the container to said knife.

6. A device of the character described comprising a channel member one end of the base of which is formed as a knife, the flanges of said channel member at the opposite end thereof having a substantially spoon-shaped spout secured thereto, said flanges being adapted to engage the walls of a container from a point spaced from one edge thereof to the opposite edge thereof and force them into contact with one another, said spout having an opening formed therein receiving the portions of the container lying between the first named edge thereof and those portions lying between the flanges.

7. A device of the character described comprising a channel member one end of the base of which is formed as a knife, the flanges of said channel member at the opposite end thereof having a substantially spoon-shaped spout secured thereto, said flanges being adapted to engage the walls of a container from a point spaced from one edge thereof to the opposite edge thereof and force them into contact with one another, said spout having an opening formed therein receiving the portions of the container lying between the first named edge thereof and those portions lying between the flanges, and a cover for said spout hinged to the base of the channel.

8. A device of the character described comprising a channel member one end of the base of which is formed as a knife, the flanges of said channel member at the opposite end thereof having a substantially spoon-shaped spout secured thereto, said flanges being adapted to engage the walls of a container from a point spaced from one edge thereof to the opposite edge thereof and force them into contact with one another, said spout having an opening formed therein receiving the portions of the container lying between the first named edge thereof and those portions lying between the flanges, the base of the channel member at the opposite end thereof being formed as a knife.

9. A device of the character described comprising a channel member one end of the base of which is formed as a knife, the flanges of said channel member at the opposite end thereof having a substantially spoon-shaped spout secured thereto, said flanges being adapted to engage the walls of a container from a point spaced from one edge thereof to the opposite edge thereof and force them into contact with one another, said spout having an opening formed therein receiving the portions of the container lying between the first named edge thereof and those portions lying between the flanges, the base of the channel member at the opposite end thereof being formed as a knife, the flanges of the channel member at said end being extended beyond the knife to provide guides directing the walls of a container to said knife.

10. A device of the character set forth comprising a blade adapted to remove an upper portion of a closed container, a closure for a part of the opening formed by the removal of said container portion, the closure carrying the blade and adapted to be applied to the container during the removal of said portion thereof, and a spout carried by the closure and adapted to be arranged in communication with the remainder of the opening during the removal of said container portion and the application of the closure.

In testimony whereof I hereunto affix my signature.

JOSEPH J. SCHMERLER.